United States Patent [19]
Macomber

[11] Patent Number: 5,426,852
[45] Date of Patent: Jun. 27, 1995

[54] POWER HOE

[76] Inventor: Lance R. Macomber, Zephyr Cove, Nev. 89448

[21] Appl. No.: 81,568
[22] Filed: Jun. 23, 1993
[51] Int. Cl.⁶ .............................................. B25F 3/00
[52] U.S. Cl. .................................... 30/122; 30/276; 30/277.4; 172/41
[58] Field of Search ................ 30/122, 171, 276, 347, 30/205, 206, 300–303, 277.4, 309, 310, 318; 172/376, 377, 41; 366/343, 129, 317

[56] References Cited

U.S. PATENT DOCUMENTS

| | | |
|---|---|---|
| 3,174,224 | 3/1965 | Rousselet . |
| 4,055,890 | 11/1977 | Seibold .................................. 30/206 |
| 4,286,675 | 9/1981 | Tuggle .................................... 30/347 |
| 4,501,332 | 2/1985 | Straayer ................................. 30/122 |
| 4,522,505 | 6/1985 | Medd . |
| 4,971,161 | 11/1990 | Godell .................................... 30/122 |
| 5,056,605 | 10/1991 | Bond et al. ............................. 30/347 |

FOREIGN PATENT DOCUMENTS 0295516  11/1991  Germany .............................. 30/347

Primary Examiner—Eugenia Jones
Assistant Examiner—Allan M. Schrock
Attorney, Agent, or Firm—Heslin & Rothenberg

[57] ABSTRACT

A power hoe attachment for attachment to a power grass trimmer or the like includes a blade member of a continuous length having a first end attached to a disc shaped member and a second end attached to the disc shaped member. The disc shaped member contains a means for securing the same to a power grass trimmer. When affixed to the power grass trimmer, the power grass trimmer will be converted into a power hoe and the blade member used while rotating to turn soil.

8 Claims, 2 Drawing Sheets

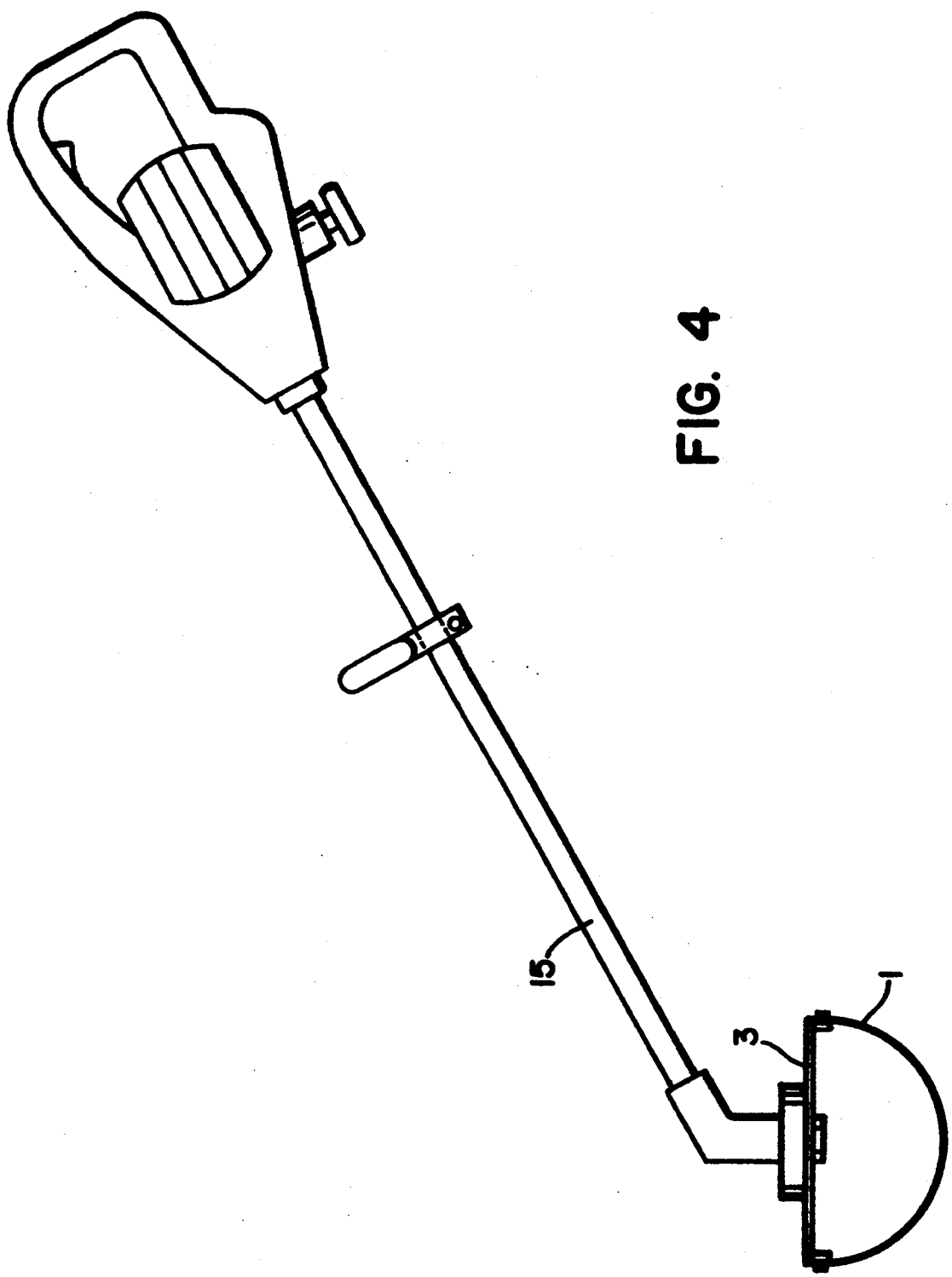

POWER HOE

BACKGROUND OF THE INVENTION

This invention relates to the field of garden and power garden equipment. More particularly, the invention relates to a power hoe attachment for a power grass trimmer or the like for use in turning soil.

Power grass trimmers or the like are used to trim grass and other vegetation in areas where lawn mowers cannot reach. For example, walls, fences and other similar objects may contain vegetation growth thereby which cannot be accessed by a power mower. Conventional grass trimmers and the like typically contain a spool of nylon wire having a portion of the nylon extending tangentially therefrom. The nylon spool is rotated on a shaft of a power grass trimmer at a rotational velocity sufficient to cause the nylon line extending therefrom to cut vegetation as it passes therethrough. Such power grass trimmers have also been used as lawn edgers.

It is desirable to provide a system for turning dirt which will utilize a power lawn trimmer or the like.

It is also desirable to provide an attachment to be used on a power lawn trimmer or the like to convert the same into a power hoe for turning soil.

SUMMARY OF THE INVENTION

The aforementioned may be achieved by utilizing a power hoe attachment in accordance with the principles of the present invention.

The power hoe attachment may include a disc shaped member, a means for removably securing said disc shaped member to a power grass trimmer or the like, and a blade member having a first and second end attached to the disc shaped member. The first and second ends of the blade member may be mounted on the disc shaped member at points oriented 180° from a center of the disc shaped member.

The blade member may be removably secured from said disc shaped member and may be removably secured to said disc shaped member by fastening means. The fastening means may comprise one or more bolts.

The blade member may be symmetrically oriented about an axis running perpendicular through the center of said disc shaped member.

The means for removably securing said disc shaped member to a power grass trimmer or the like may include comprises a threaded arbor and the disc shaped member is removably secured to power grass trimmer or the like.

BRIEF DESCRIPTION OF THE DRAWINGS

The invention may best be understood by reading the detailed description in conjunction with the drawings in which:

FIG. 4 depicts the power hoe attachment of FIG. 1 mounted on a power grass trimmer.

DETAILED DESCRIPTION

Figure 1:
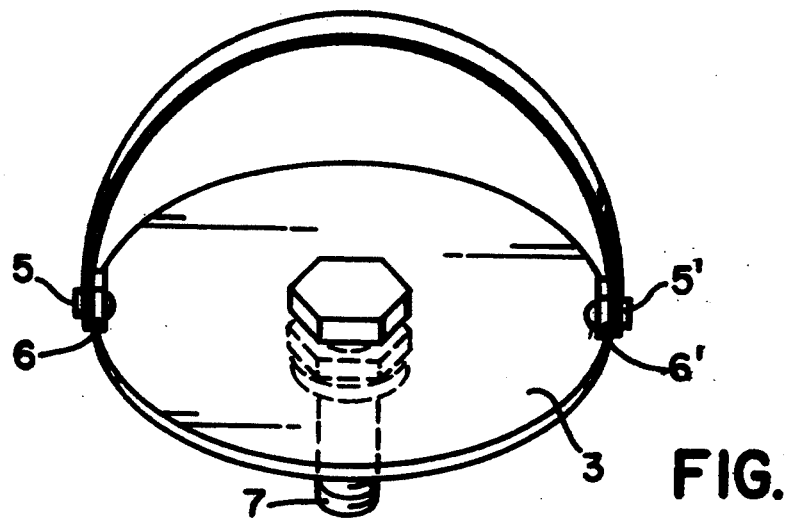
FIG. 1 depicts an isometric view of the power hoe attachment constructed in accordance with the principles of the present invention.
Figure 2:
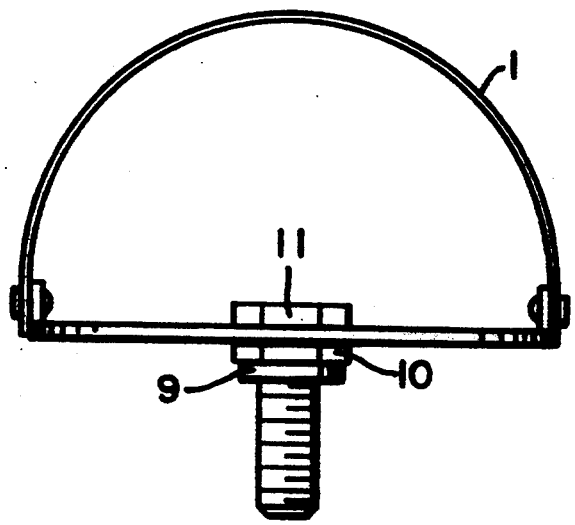
FIG. 2 depicts a side view of the power hoe attachment depicted in FIG. 1.
Figure 3:
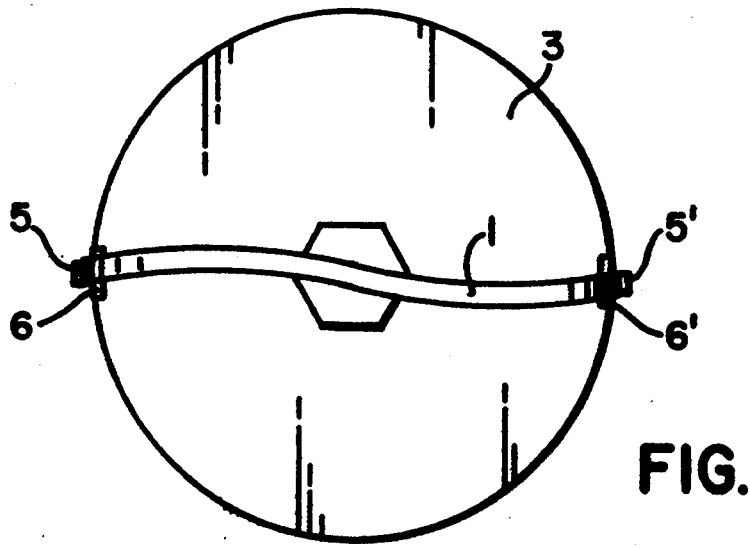
FIG. 3 depicts a top view of the power hoe attachment constructed in accordance with the principles of the present invention having a blade member having its ends thereof in an offset position.

Referring to FIGS. 1 and 2, the power hoe attachment constructed in accordance with the principles of the present invention includes a blade member 1, a disc shaped member 3, and a means for attaching the disc shaped member 3 to a power grass trimmer or the like. The disc shaped member is preferably circular in configuration having an outer diameter surrounding a center of the disc. As shown in FIGS. 1 and 2, the blade member may be curved in shape having a first end affixed to the disc shaped member and a second end affixed to the disc shaped member at a point 180° on a line extending directly through the center of the disc shaped member. The blade member, however, need not be curved in shape. However, as shown in FIGS. 1 and 3, the blade member should be symmetrically oriented about a plane having a central axis of the disc shaped member therein. With such a configuration, rotation of the power hoe attachment on a power grass trimmer or the like will not result in centrifugal forces acting on the blade member which are not counterbalanced by an equal and opposite centrifugal forces. Accordingly, the blade member will be perfectly balanced so as to not cause excessive vibration or stress within the blade member or disc shaped member or any means supporting the disc shaped member.

As shown in FIG. 3, the blade member 1 may be offset in configuration wherein the blade does not fit within a plane extending perpendicularly through the center of the disc shaped member 3. However, the blade should be perfectly balanced about a point thereon lying within a line extending perpendicular through the center of the disc shaped member 3.

The blade member may contain cutting edges thereon if desired. The blade member may be permanently affixed to the disc shaped member. Alternatively, the blade member may be removably secured to the disc shaped member by a fastening means such as one or more bolts 5, 5' or the like. The bolts 5, 5' may be inserted through holes within tabs 6, 6' extending from the disc shaped member 3.

The disc shaped member is rotatable about an axis extending through the center thereof so that the blade member rotates with the disc shaped member. Again, preferably, the blade member is balanced so that the blade member rotates symmetrically about the axis extending through the center of the disc shaped member.

A means for connecting the disc shaped member to a power grass trimmer or the like should be used. Such a means may include an arbor 7 or threaded portion having a collar 9 thereon which may be shaped to be engaged by a wrench or the like. The arbor 7 may extend through a hole in the center of the disc shaped member and have a head 11 on the top side of the disc shaped member. A nut or the like 10 may be used to secure the arbor 7 to the disc shaped member 3. However, the arbor 7 may also be permanently affixed to the disc shaped member 3. The power hoe attachment is attached to a power grass trimmer or the like by threading the arbor into a grass trimmer. The collar is used to secure the arbor and tighten the same onto a power lawn trimmer such as that depicted in FIG. 4. Other equivalent means for securing the disc shaped member to a power grass trimmer will suffice and will be apparent to one of ordinary skill in the art. The means for securing the disc shaped member may be sized for a particular power grass trimmer or the like. Additionally, the means for securing the disc shaped member to the power grass trimmer may include a clutch member to protect the power hoe attachment from damaging the power grass trimmer.

When the power hoe attachment is attached to a power grass trimmer 15 or the like by the means for attaching the same to the power grass trimmer as shown in FIG. 4, the power grass trimmer 15 may be used as a power hoe whereby the leg member rotates within dirt to loosen the soil.

While the invention has been disclosed in accordance with the embodiments depicted herein, it will be apparent to one skilled in the art that various modifications and substitutions may be made without departing from the scope of the invention as defined in the following claims.

I claim:

1. A power hoe attachment for converting a power trimmer into a power hoe, comprising:
   a rotatable disc shaped member;
   a means for removably securing said disc shaped member to a power trimmer; and
   a blade member being continuous between a first and second end thereof, wherein each end is affixed to the rotatable disc shaped member so that said blade member is arc shaped when viewed in a direction parallel to the disc shaped member, said first and second ends being engaged to said disc shaped member at points oriented 180° from each other in a plane having a central axis of said disc shaped member therein, said blade having a curvature in a first direction which is parallel to the disc shaped member and perpendicular to said plane at a portion thereof located on a first side of said plane, and a curvature in a second direction opposite to said first direction at a portion thereof located on a second side of said plane.

2. The power hoe attachment of claim 1 wherein said blade member is removably secured from said disc shaped member.

3. The power hoe attachment of claim 2 wherein said blade member is removably secured to said disc shaped member by fastening means.

4. The power hoe attachment of claim 3 wherein said fastening means comprises at least one bolt.

5. The power hoe attachment of claim 1 wherein said blade member is symmetrically oriented about said.

6. The power hoe attachment of claim 1 wherein said means for removably securing said disc shaped member to a power trimmer comprises a threaded arbor.

7. The power hoe attachment of claim 1 wherein said disc shaped member is removably secured to said power trimmer.

8. The power hoe attachment of claim 1 wherein said blade member is balanced about said central axis wherein centrifugal forces acting on the blade member are counterbalanced.

* * * * *